United States Patent
Li et al.

(10) Patent No.: US 11,556,723 B2
(45) Date of Patent: Jan. 17, 2023

(54) NEURAL NETWORK MODEL COMPRESSION METHOD, CORPUS TRANSLATION METHOD AND DEVICE

(71) Applicant: Beijing Xiaomi Intelligent Technology Co., Ltd., Beijing (CN)

(72) Inventors: Xiang Li, Beijing (CN); Yuhui Sun, Beijing (CN); Jialiang Jiang, Beijing (CN); Jianwei Cui, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 101 days.

(21) Appl. No.: 16/785,062

(22) Filed: Feb. 7, 2020

(65) Prior Publication Data

US 2021/0124881 A1    Apr. 29, 2021

(30) Foreign Application Priority Data

Oct. 24, 2019    (CN) .......................... 201911019142.1

(51) Int. Cl.
*G06F 40/58*    (2020.01)
*G06F 40/30*    (2020.01)
(Continued)

(52) U.S. Cl.
CPC .............. *G06F 40/58* (2020.01); *G06F 40/30* (2020.01); *G06K 9/6256* (2013.01); *G06N 3/08* (2013.01)

(58) Field of Classification Search
CPC ....... G06F 40/58; G06F 40/30; G06K 9/6256; G06N 3/08
See application file for complete search history.

(56) References Cited

U.S. PATENT DOCUMENTS 10,311,334 B1 * 6/2019 Florez Choque .... G06K 9/6231
10,963,748 B1 * 3/2021 Tulyakov ............. G06N 3/0472
(Continued)

FOREIGN PATENT DOCUMENTS

CN    105843801 A    8/2016
CN    106548190 A    3/2017
(Continued)

OTHER PUBLICATIONS

First Office Action of Chinese Application No. 201911019142.1, dated Jan. 18, 2021.
(Continued)

*Primary Examiner* — Kevin Ky
(74) *Attorney, Agent, or Firm* — Finnegan, Henderson, Farabow, Garrett & Dunner, L.L.P.

(57) ABSTRACT

A method for compressing a neural network model, includes: obtaining a set of training samples including a plurality of pairs of training samples, each pair of the training samples including source data and target data corresponding to the source data; training an original teacher model by using the source data as an input and using the target data as verification data; training intermediate teacher models based on the set of training samples and the original teacher model, one or more intermediate teacher models forming a set of teacher models; training multiple candidate student models based on the set of training samples, the original teacher model, and the set of teacher models, the multiple candidate student models forming a set of student models; and selecting a candidate student model of the multiple candidate student models as a target student model according to training results of the multiple candidate student models.

17 Claims, 7 Drawing Sheets

(51) Int. Cl.
  *G06K 9/62* (2022.01)
  *G06N 3/08* (2006.01)

(56) References Cited

U.S. PATENT DOCUMENTS

| | | | |
|---|---|---|---|
| 2018/0268292 | A1 | 9/2018 | Choi et al. |
| 2018/0349359 | A1* | 12/2018 | McCann ................. G06N 3/08 |
| 2019/0034764 | A1 | 1/2019 | Oh et al. |
| 2019/0287515 | A1* | 9/2019 | Li ........................ G10L 15/063 |
| 2020/0034703 | A1* | 1/2020 | Fukuda .................... G06N 3/08 |
| 2020/0184327 | A1* | 6/2020 | Dey ....................... G06N 3/086 |
| 2020/0272905 | A1* | 8/2020 | Saripalli ................. H03M 7/70 |
| 2021/0082399 | A1* | 3/2021 | Kurata ..................... G06N 3/08 |
| 2021/0089882 | A1* | 3/2021 | Sun .......................... G06N 3/08 |
| 2021/0192360 | A1* | 6/2021 | Bitauld ................... H04L 63/04 |

FOREIGN PATENT DOCUMENTS

| | | |
|---|---|---|
| CN | 108921294 A | 11/2018 |
| CN | 108960419 A | 12/2018 |
| CN | 109448706 A | 3/2019 |
| CN | 109492232 A | 3/2019 |
| CN | 109711544 A | 5/2019 |
| CN | 109783824 A | 5/2019 |
| CN | 109919300 A | 6/2019 |
| CN | 110059323 A | 7/2019 |
| CN | 110070183 A | 7/2019 |
| CN | 110162800 A | 8/2019 |
| CN | 110175338 A | 8/2019 |
| CN | 110175627 A | 8/2019 |
| CN | 110263353 A | 9/2019 |
| CN | 110276413 A | 9/2019 |
| KR | 2018-0019371 A | 2/2018 |
| RU | 2702978 C1 | 10/2019 |
| WO | WO 2018/126213 A1 | 7/2018 |
| WO | WO 2018/223822 A1 | 12/2018 |
| WO | WO 2019/143946 A1 | 7/2019 |

OTHER PUBLICATIONS

Rongrong, J., et al., "Deep Neural Network Compression and Acceleration: A Review", Journal of Computer Research and Development, vol. 55, No. 9, Sep. 2018, 20 pages.
Wu, Meng-Chieh, et al., "Multi-Teacher Knowledge Distillation for Compressed Video Action Recognition on Deep Neural Networks", ICASSP 2019, pp. 2202-2206, retrieved from IEEE Xplore on Mar. 11, 2021.
First Office Action of Russian Application No. 2020102388/28 dated Aug. 20, 2020.
Extended European Search Report in the European Application No. 20160494.9, dated Aug. 27, 2020.
International Search Report in the International Application No. PCT/CN2019/120801, dated Jul. 24, 2020.
Mirzadeh, Seyed-Iman et al., *Improved Knowledge Distillation via Teacher Assistant: Bridging the Gap Between Student and Teacher*, https://arxiv.org/abs/1902.03393v1, Feb. 9, 2019, 12 pages.
English version of International Search Report in International Application No. PCT/CN/2019/120801, dated Jul. 24, 2020.
Xiang, Li, et al., "Improving the Translation Quality of Compressed Neural Machine Translation Models with Monolingual Data", Journal of Chinese Information Processing, Jul. 31, 2019, 11 pgs.
The Third Office Action of Chinese Application No. 201911019142. 1, dated Sep. 13, 2021.
Sudoh, K., "Advances of Neural Machine Translation Evolution of Sequence-to-Sequence Models and Their Application", Human Engineering, vol. 34, No. 4, Jul. 2019, pp. 437-445.
Notice of Reasons for Refusal dated Jan. 25, 2022, from the Japanese Patent Office issued in counterpart Japanese Application No. 2020-502271.
Notification of Reason for Refusal dated Jan. 26, 2022, from the Korean Intellectual Property Office issued in counterpart Korean Application No. 10-2020-7002213.
Decision of Refusal for Japanese Patent Application No. 2020-502271, dated Aug. 9, 2022, 8 pages.
Chen, G., et al., "Learning Efficient Object Detection Models with Knowledge Distillation", 31st Conference on Neural Information Processing Systems (NIPS 2017), Long Beach, CA, USA, 10 pages.
Knowledge distillation by Keras ~TGS(kaggle)~—Qiita, updated Apr. 16, 2019, retrieved from https://qiita.com/M_Hiro/items/0ba24788c78540046bcd, Nov. 3, 2022, 27 pages.
Knowledge Distillation in Deep Learning | Code Craft House, dated Jan. 12, 2018, retrieved from codecrafthouse.jp/p/2018/01/knowledge-distillation/#id13, Nov. 3, 2022, 34 pages.

* cited by examiner

NEURAL NETWORK MODEL COMPRESSION METHOD, CORPUS TRANSLATION METHOD AND DEVICE

CROSS-REFERENCE TO RELATED APPLICATIONS

The present application is based upon and claims priority to Chinese Patent Application No. 201911019142.1, filed on Oct. 24, 2019, the entire contents of which are incorporated herein by reference.

TECHNICAL FIELD

The present disclosure relates to the field of machine translation, and in particular, to a neural network model compression method for machine translation, a corpus translation method and device, an electronic device, and a computer-readable storage medium.

BACKGROUND

With the development of artificial intelligence technologies, deep learning based on neural networks has achieved good performance on various machine learning tasks, such as image classification, machine translation, speech recognition and so on.

At present, in order to obtain an optimal network model output result, deep neural network models containing multiple network layers and parameters of extremely large scale are usually used. Although such complex network structure significantly improves the output result of the model, it also causes the difficulty of deployment on mobile devices with small storage space. On the other hand, it also results in too long inference delays on low-power mobile devices with poor computing performance, which is not practical. Therefore, techniques of efficiently compressing complex neural network models to reduce model storage overhead, improving model inference speed while minimizing the damage to translation quality caused by the compression have become critical techniques for practical application of the network models in mobile devices, and are currently research hot points in industry and academy.

For neural network model compression, commonly used methods include parameter quantization, matrix decomposition, model pruning, and knowledge distillation. Among them, the knowledge distillation method can not only compress the model to reduce the complexity of the model, but also alleviate the problem of reduced prediction accuracy caused by model compression, and has become the mainstream of the neural network model compression methods. In the knowledge distillation model compression method, models with large scale parameters and complex network structures are generally referred to as "teacher models", and models with fewer parameters and relatively simple structures are referred to as "student models". Output information of the teacher models at intermediate layers of the network or classification information at an output layer is obtained, and such extra knowledge generated from the teacher models is used to guide training of the student models. In the training, a KL divergence or the like is generally used as an optimization target of the knowledge distillation.

SUMMARY

According to a first aspect of embodiments of the present disclosure, a method for compressing a neural network model, includes: obtaining a set of training samples including a plurality of pairs of training samples, each pair of the training samples including source data and target data corresponding to the source data; training an original teacher model by using the source data as an input and using the target data as verification data; training one or more intermediate teacher models based on the set of training samples and the original teacher model, the one or more intermediate teacher models forming a set of teacher models; training multiple candidate student models based on the set of training samples, the original teacher model, and the set of teacher models, the multiple candidate student models forming a set of student models; and selecting a candidate student model of the multiple candidate student models as a target student model according to training results of the multiple candidate student models.

According to a second aspect of embodiments of the present disclosure, a corpus translation method includes: obtaining a corpus; translating the corpus with a neural network model, wherein the neural network model is a target student model obtained by the method for compressing the neural network model of the first aspect; and outputting a translation result.

According to a third aspect of embodiments of the present disclosure, a device for compressing a neural network model, includes: a processor; and a memory storing instructions executed by the processor, wherein the processor is configured to: obtain a set of training samples including a plurality of pairs of training samples, each pair of the training samples including source data and target data corresponding to the source data; train an original teacher model by using the source data as an input and the target data as verification data; train one or more intermediate teacher models based on the set of training samples and the original teacher model, the one or more intermediate teacher models forming a set of teacher models; train multiple candidate student models based on the set of training samples, the original teacher model and the set of teacher models, the multiple candidate student models forming a set of student models; and select a candidate student model of the multiple candidate student models as a target student model according to training results of the multiple candidate student models.

According to a fourth aspect of embodiments of the present disclosure, a corpus translation device, includes: a processor; and a memory storing instructions executed by, the processor, wherein the processor is configured to: obtain a corpus; translate the corpus with a neural network model, wherein the neural network model is a target student model obtained by the method for compressing the neural network model of the first aspect; and output a translation result.

According to a fifth aspect of embodiments of the present disclosure, a non-transitory computer-readable storage medium has stored therein instructions that, when executed by a processor of a device, cause the device to perform the method for compressing the neural network model of the first aspect or the corpus translation method of the second aspect.

The technical solutions provided by the embodiments of the present disclosure can include the following beneficial effects. By additionally introducing a plurality of intermediate teacher models of less number of parameters, the training of the student models can be guided in multiple paths, and thus the knowledge of the original teacher model can be gradually transferred to the student models more effectively, and a student model with the best quality can be selected from the multiple student models generated based on the multiple paths as a final target student model, which improves the quality of the student models.

It is to be understood that both the foregoing general description and the following detailed description are exemplary and explanatory only and are not restrictive of the present disclosure, as claimed.

BRIEF DESCRIPTION OF THE DRAWINGS

The drawings herein are incorporated in and constitute a part of this specification, illustrate embodiments consistent with the present disclosure, and together with the description serve to explain the principles of the present disclosure.

DETAILED DESCRIPTION

Exemplary embodiments will be described in detail here, examples of which are illustrated in the accompanying drawings. When the following description refers to the accompanying drawings, the same numerals in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

In some embodiments, a process of knowledge distillation training, a single-level knowledge distillation method in which a teacher model guides a student model may be used. Because the prediction accuracy of the teacher model is generally much better than the student model, it may be difficult to efficiently migrate the knowledge of the teacher model to the student model by using the single-level knowledge distillation, and thus it may be difficult to obtain a neural network student model with better prediction accuracy for deployment on mobile terminals.

Figure 1:
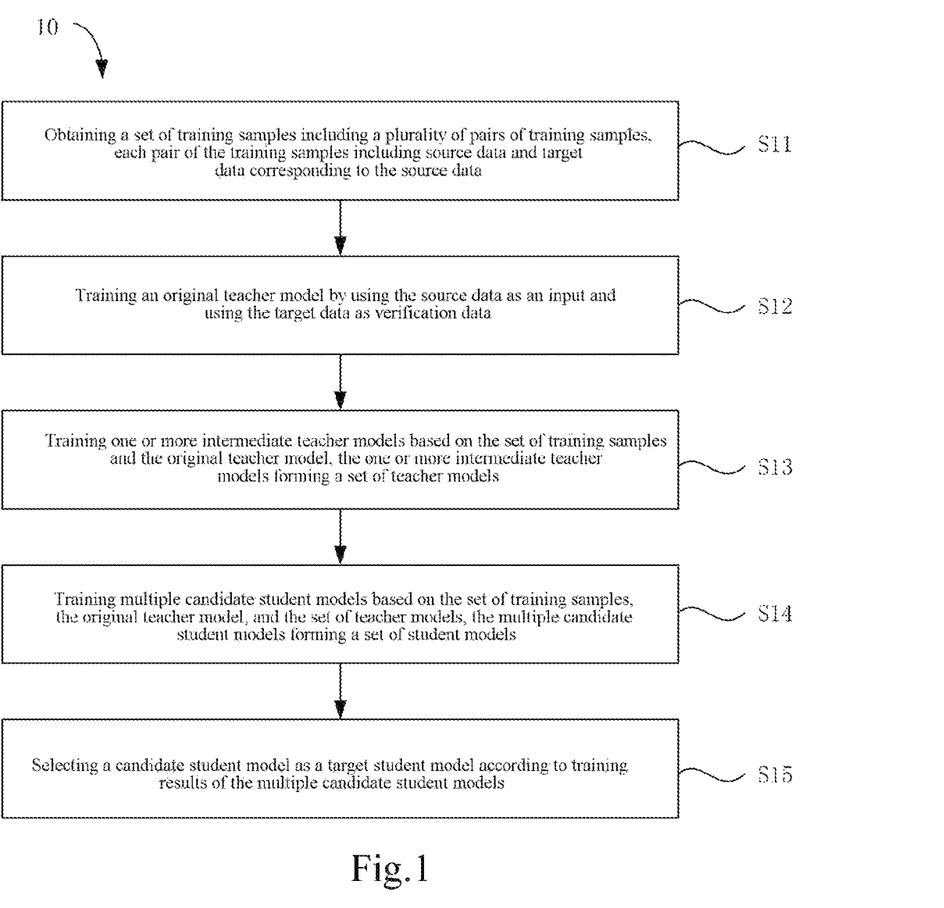
FIG. 1 is a flowchart of a method for compressing a neural network model according to an exemplary embodiment.

FIG. 1 is a flowchart of a method 10 for compressing a neural network model, according to an exemplary embodiment. For example, the method 10 may improve the training effect of a student model. Referring to FIG. 1, the method 10 for compressing the neural network model includes steps S11-S15, each of which will be described in detail below.

In step S11, a set of training samples including a plurality of pairs of training samples is obtained, each pair of the training samples including source data and target data corresponding to the source data.

The training samples can be obtained according to actual application scenarios of the neural network model. The source data in the training samples are used to be input into the neural network model, and the target data are used to verify the output of the neural network model. Parameters of the neural network model can be adjusted based on a verification result, for example, by calculating a loss, for the purpose of training. For example, in the field of image recognition, an original image and a standard classification of the original image are obtained, in the field of speech recognition, an original audio and a standard text of the original audio are obtained, and in one embodiment, in the field of corpus translation, a first language corpus is obtained as original data, and a second language corpus that has the same meaning as the first language corpus is obtained as the target data.

In step S12, an original teacher model is trained by using the source data as an input and using the target data as verification data.

The original teacher model is trained according to a structure of the actual network model. The source data can be input to the original teacher model, and features of the source data can be extracted from the original teacher model and an output result can be obtained. A loss value is calculated based on the output result and the target data. The parameters of the original teacher model are adjusted based on the loss value until the output result meets certain conditions, and the training is completed.

Figure 2:
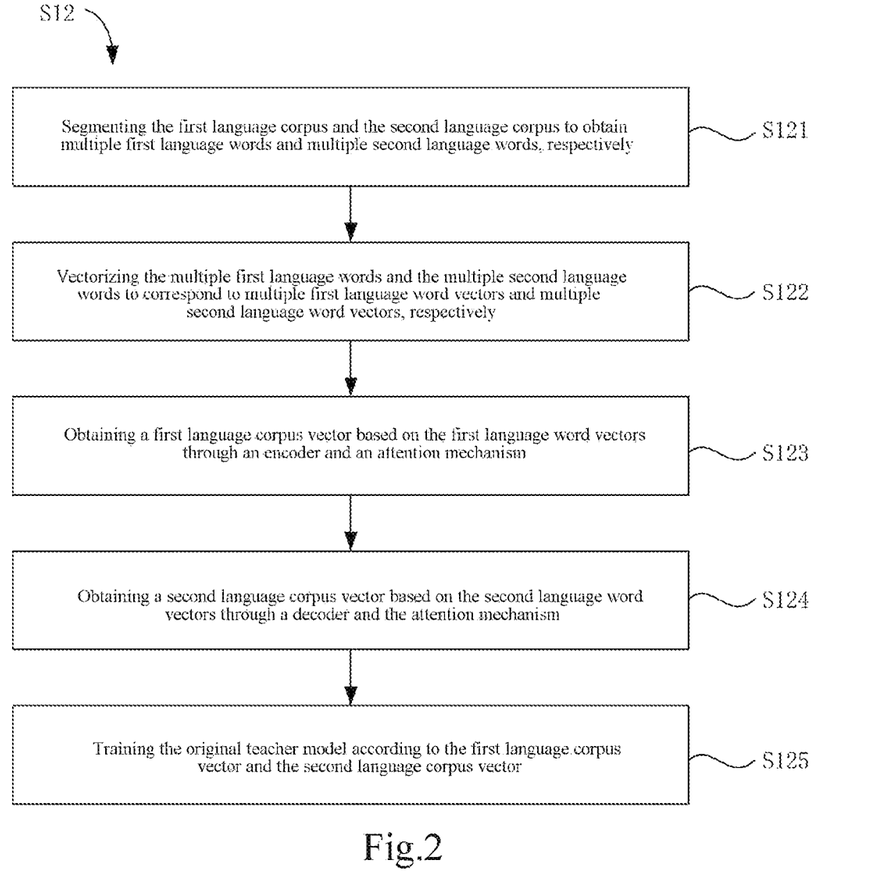
FIG. 2 is a flowchart of a method for compressing a neural network model according to an exemplary embodiment.

FIG. 2 is a flowchart of a method for compressing a neural network model according to an exemplary embodiment. In the embodiment, the step S12 can include: segmenting the first language corpus and the second language corpus to obtain multiple first language words and multiple second language words, respectively in step S121; vectorizing the multiple first language words and the multiple second language words to correspond to multiple first language word vectors and multiple second language word vectors, respectively in step S122; obtaining a first language corpus vector based on the first language word vectors through an encoder and an attention mechanism in step S123; obtaining a second language corpus vector based on the second language word vectors through a decoder and the attention mechanism in step S124; and training the original teacher model according to the first language corpus vector and the second language corpus vector in step S125.

In the corpus translation model, the vector of the corpus obtained through the vectorization, the feature extraction and the attention mechanism is compared with a vector generated from standard semantics so as to perform the training.

Figure 3:
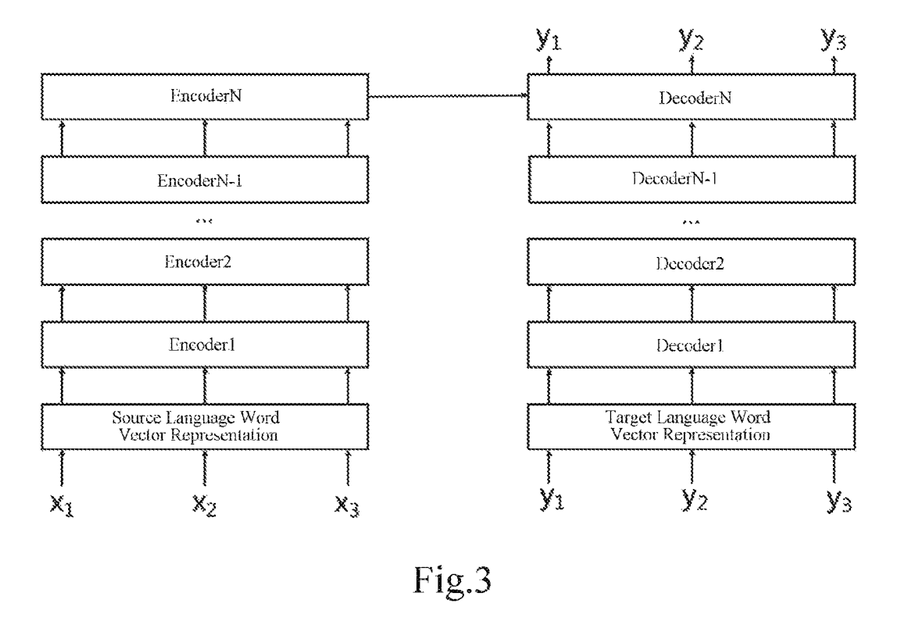
FIG. 3 is a schematic diagram of a neural network model architecture according to an exemplary embodiment.

FIG. 3 shows an exemplary architecture of the original teacher model in the above embodiment. The multiple first language words $x_n$ are obtained through word segmentation of the first language corpus, and are vectorized through a source language word vector representation layer so as to obtain the first language word vectors, features are extracted through multiple encoder layers, and the first language corpus vector is obtained through the attention mechanism. On the other side, the multiple second language words $y_n$ are obtained through word segmentation of the second language corpus, and are vectorized through a target language word vector representation layer so as to obtain the second language word vector, features are extracted through multiple decoder layers, and the second language corpus vector is obtained through the attention mechanism. Finally, a loss function is used to obtain the loss value between the first language corpus vector and the second language corpus vector. Based on the loss value, the parameters of the original teacher model are adjusted, and the trained original teacher model is obtained. The encoder layers and the decoder layers can have the same or different number of layers.

Referring back to FIG. 1, in step S13, one or more intermediate teacher models are trained based on the set of training samples and the original teacher model, the one or more intermediate teacher models forming a set of teacher models.

According to actual requirements, multiple intermediate teacher models may be obtained to implement multi-path training of student models. The model type and architecture of the intermediate teacher models may be the same as those of the original teacher model. In one embodiment, the number of model parameters of any of the intermediate teacher models is less than the number of the model parameters of the original teacher model. In other words, the intermediate teacher models are more simplified than the original teacher model. In an embodiment, the number of model layers of any of the intermediate teacher models is less than the number of model layers of the original teacher model. That is, the number of the model parameters is reduced by reducing the number of model layers. By directly reducing the number of the model parameters, or by reducing the number of the model layers, an amount of calculation for the model is reduced, and the training can be performed by using the output of the original teacher model.

In an embodiment, if the original teacher model has the model architecture shown in FIG. 3, the intermediate teacher models can have fewer encoder layers and/or fewer decoder layers than the original teacher model.

Some of the multiple intermediate teacher models may have the same degree of simplification. The simplification degrees of the multiple intermediate teacher models can be in a stepped shape. That is, the model simplification degrees of the multiple intermediate teacher models gradually increase in sequence so that a variety of different models can be used for supervision in subsequent training to obtain multiple paths.

The method of training the intermediate teacher models may be the same as that of training the original teacher model in principle.

In an embodiment, the step S13 may include training each of the intermediate teacher models to be trained by using the source data as an input and using pseudo target data output by the complex teacher model as verification data. The complex teacher model is the original teacher model that has been trained, or another intermediate teacher model that has been trained and has a greater number of the model parameters than that of the current intermediate teacher model under training.

In this embodiment, after the original teacher model and the intermediate teacher models are trained, the source data are input to the model again so as to obtain an output of the model, which is the aforementioned pseudo target data, and the pseudo target data can be used to perform verification in the training of a model that is more simplified than the current model. For example, in training an intermediate teacher model, the source data are input to the intermediate teacher model, and the output result is obtained from the intermediate teacher model. The output result is compared with the pseudo target data output by the trained original teacher model based on the source data so as to obtain the loss value, or compared with pseudo target data output by another intermediate teacher model that has been trained and is more complex than the intermediate teacher model under training based on the source data so as to obtain the loss value. The model parameters are adjusted according to the obtained loss value, and the training of the current model is completed.

In some embodiments, one or more intermediate teacher models in the set of teacher models are ranked in a descending order of the numbers of the model parameters thereof, so that the number of model parameters of the intermediate teacher model in a subsequent rank is less than that of the intermediate teacher model in a preceding rank, and the complex model used to train the intermediate teacher model of the current rank is the original teacher model that has been trained or the intermediate teacher model in any preceding rank that has been trained.

In this embodiment, the intermediate teacher models are sequentially trained according to the simplification degrees thereof. The relatively more complex intermediate teacher model is trained first, and the pseudo-target data output by the trained intermediate teacher model can be used as the verification data in the training of a subsequent intermediate teacher model. Therefore, in training intermediate teacher models, there may be pseudo target data output by multiple complex models which can be used as verification data for selection, so that the supervision data for each intermediate teacher model can come from a different source, and the multiple intermediate teacher models can have different training paths even if they are of the same simplification degree, thereby obtaining different intermediate teacher models.

In some embodiments, the output data can be obtained from the original teacher model based on a beam search algorithm. After the training is completed, the original data, that is, the first language corpus, are input into the original teacher model, and the output data are obtained through the beam search algorithm.

In step S14, multiple candidate student models are trained based on the set of training samples, the original teacher model, and the set of teacher models, the multiple candidate student models forming a set of student models.

In order to enable the neural network model to be deployed on some terminal devices with relatively low computing capabilities, there may be requirements for complexity of the model and the amount of calculation. According to the actual conditions of the terminal devices, a plurality of candidate student models that are of similar architectures to those of the original teacher model and the intermediate teacher models but are more simplified than the original teacher model and the intermediate teacher models can be set. In an embodiment, the step S14 may include obtaining a plurality of identical student models, and the number of the model parameters and/or the number of model layers of the candidate student models are smaller than those of any of the intermediate teacher models.

The method for training the candidate student models can be the same as that for training the intermediate teacher models in principle.

In an embodiment, the step S14 may include determining multiple training paths, each of which corresponds to one of the candidate student models, and starts from the original teacher model and directly arrives at the corresponding candidate student model, or starts from the original teacher model, passes at least one of the intermediate teacher models and arrives at the corresponding candidate student model; and training the corresponding candidate student model on each of the training paths or training the corresponding at least one intermediate teacher model and the corresponding candidate student model on the training path in the order of the models arranged on the training path.

In training a student model based on a training path, when the training path starts from the original teacher model and directly arrives at the corresponding candidate student model, the source data are used as the input and the pseudo target data output by the original teacher model that has been trained are used as the verification data for the corresponding candidate student model, so that the candidate student model is trained. When the training path starts from the original teacher model, passes at least one intermediate teacher model and arrives at the corresponding candidate student model, the source data are used as the input, and the pseudo target data output by a preceding adjacent complex teacher model on the training path are used as the verification data so that the respective intermediate teacher models are trained, and the pseudo target data output by the preceding intermediate teacher model adjacent to the candidate student model on the training path are used as the verification data for the candidate student model so that the candidate student model is trained. The complex teacher model is the original teacher model that has been trained, or another intermediate teacher model that has been trained and has the number of model parameters which is greater than that of the current intermediate teacher model under training.

The training path is a virtual path formed by the models that guide the training in sequence. Each training path includes the original teacher model as a starting point and a candidate student model as an end point, and there may be no intermediate teacher model, or there may be intermediate teacher models one or more parameters of which are different from each other. The models are trained according to the complexities thereof, for example, in a descending order of the numbers of the parameters thereof. Therefore, by designating the multiple training paths and training the multiple candidate student models correspondingly, the knowledge of the original teacher model can be gradually transferred to the student models more effectively, which improves the quality of the student models.

Figure 4:
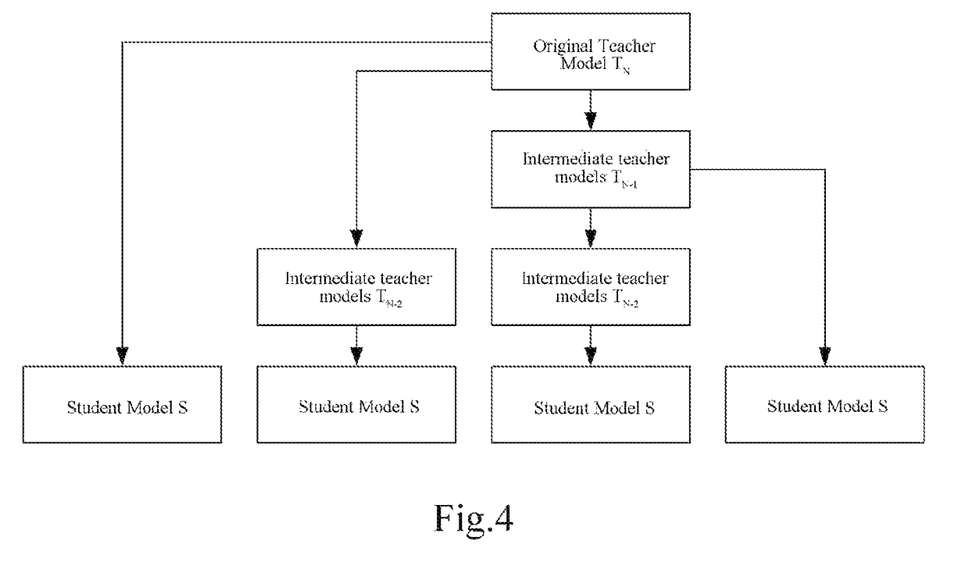
FIG. 4 is a schematic diagram of different training paths for a student model according to an exemplary embodiment.

FIG. 4 is a schematic diagram of different training paths for a student model according to an exemplary embodiment. As shown in FIG. 4, there are an original teacher model $T_N$ and intermediate teacher models $T_{N-1}$ and $T_{N-2}$ in two ranks the complexities of which gradually decrease. The original teacher model $T_N$ is trained by the set of training samples $D_{ny}^T = \{(x_1, y_1), \ldots, (x_n, y_n)\}$, in which x is the source data and y is the corresponding target data. After the original teacher model is trained, the source data x are input to the original teacher model again to obtain the corresponding pseudo-target data $y^T$, and a set of pseudo target data of the original teacher model $D_{xy}^{T1} = \{(x_1 y_1^T), \ldots, (x_n, y_n^T)\}$ is obtained. For the intermediate teacher model $T_{N-1}$, since there is only one original teacher model $T_N$ which is more complex than the intermediate teacher model $T_{N-1}$, it can be trained only by the original teacher model $T_N$, that is, trained through the set of pseudo target data of the original teacher model $D_{xy}^{T1} = \{(x_1, y_1^T), \ldots, (x_n, y_n^T)\}$. After the intermediate model $T_{N-1}$ is trained by using the source data x as the input and the pseudo target data $y^T$ as the verification data, a set of pseudo target data is obtained in the same way. Since the intermediate teacher model $T_{N-2}$ is more simplified than both the original teacher model $T_N$ and the intermediate teacher model $T_{N-1}$, it can be trained by the original teacher model $T_N$ or the intermediate teacher model $T_{N-1}$. That is, the training can be performed by using the source data as the input and using the pseudo target data of the original teacher model $T_N$ or the pseudo target data of the intermediate teacher model $T_{N-1}$ as the verification data. Therefore, there can be two intermediate teacher models $T_{N-2}$, which are trained by the original teacher model $T_N$ and the intermediate teacher model $T_{N-1}$, respectively, thereby forming different training paths. On this basis, four candidate student models S can be set, and can be trained in the same principle by the original teacher model $T_N$, the intermediate teacher model $T_{N-1}$, and the two intermediate teacher models $T_{N-2}$ which are trained through the different paths. The candidate student models that are trained according to different training paths have different parameters.

In step S15, a candidate student model is selected as a target student model according to training results of the multiple candidate student models.

Among the multiple candidate student models obtained through different training paths, a candidate student model is selected as the target student model. The target student model can meet the requirements of the terminal device for the complexity of the model and also the requirements for the quality of the neural network model. In an embodiment, step S15 may include testing accuracy of output results of the multiple candidate student models through a set of verification data, and selecting the target student model according to the accuracy. Among the multiple candidate student models that have completed training, the candidate student model with the best quality is selected as the target student model. The selection can be performed by testing multiple student models through the set of validation data, where the principle of the set of validation data is the same as that of the set of training samples and the set of validation data includes test data and standard result data corresponding to the test data. Also, noise interference can be added to the test data as compared to the source data in the set of training samples, and the selection is then performed based on the comparison of the accuracy between the output results of the candidate student models and the standard result data so that the candidate student model with the highest accuracy is selected as the target student model.

With the neural network model compression method of any of the above embodiments, multiple student models that meet the requirements for the simplification can be trained, and an optimal one can be selected from the student models that have completed training through different training paths as the target student model, so that a neural network model which is more simplified and of higher quality can be obtained.

Figure 5:
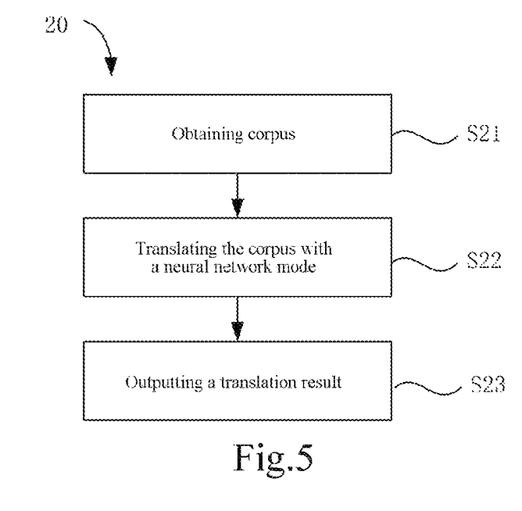
FIG. 5 is a flowchart of a corpus translation method according to an exemplary embodiment.

FIG. 5 is a flowchart of a corpus translation method 20 according to an exemplary embodiment. Referring to FIG. 5, the corpus translation method 20 includes obtaining a corpus in step S21; translating the corpus with a neural network model in step S22, the neural network model being the target student model obtained by the neural network model compression method 10 of any of the above embodiments; and outputting a translation result in step S23.

Figure 6:
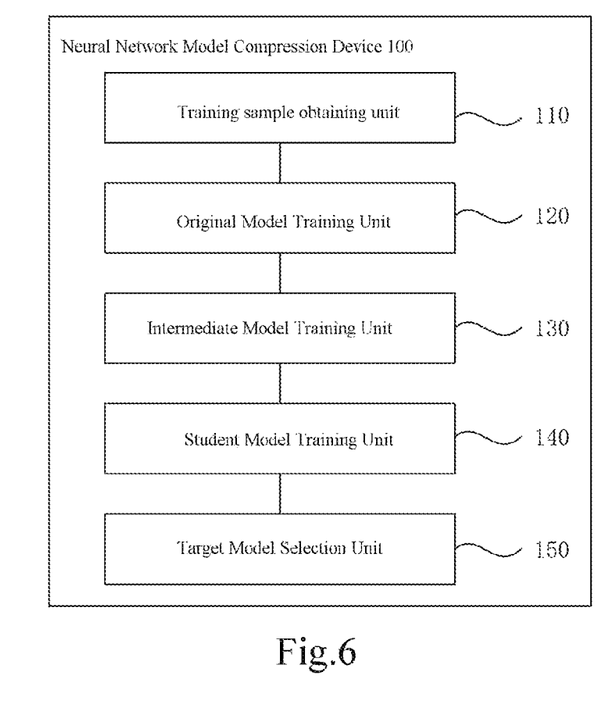
FIG. 6 is a block diagram of a device for compressing a neural network model according to an exemplary embodiment.

FIG. 6 is a block diagram of a neural network model compression device 100, according to an exemplary embodiment. As shown in FIG. 6, the neural network model compression device 100 includes: a training sample obtaining unit 110, configured to obtain a set of training samples including a plurality of pairs of training samples, each pair of the training samples including source data and target data corresponding to the source data; an original model training unit 120, configured to train an original teacher model by using the source data as an input and the target data as verification data; an intermediate model training unit 130, configured to train one or more intermediate teacher models based on the set of training samples and the original teacher model, the one or more intermediate teacher models forming a set of teacher models; a student model training unit 140, configured to train multiple candidate student models based on the set of training samples, the original teacher model and the set of teacher models, the multiple candidate student models forming a set of student models; and a target model selection unit 150, configured to select one of the multiple candidate student models as a target student model according to training results of the multiple candidate student models.

In an embodiment, the number of model parameters of any of the intermediate teacher models is less than that of the original teacher model.

In an embodiment, the intermediate model training unit 130 is further configured to train each of the intermediate teacher models to be trained by using the source data as the input and using pseudo target data output by a complex teacher model as the verification data. The complex teacher model is the original teacher model that has been trained, or another intermediate teacher model that has been trained and has the number of model parameters that is greater than that of the intermediate teacher model currently under training.

In an embodiment, the one or more intermediate teacher models in the set of teacher models are ranked in a descending order of the numbers of the model parameters thereof, so that the number of model parameters of the intermediate teacher model in a subsequent rank is less than that of the intermediate teacher model in a preceding rank, and the complex teacher model used to train the intermediate teacher model of the current rank is the original teacher model that has been trained or the intermediate teacher model of any of preceding ranks that has been trained.

In an embodiment, the student model training unit 140 further includes a path determining sub-unit configured to determine multiple training paths, each of which corresponds to one of the candidate student models and starts from the original teacher model and directly arrives at the corresponding candidate student model, or starts from the original teacher model, passes at least one of the intermediate teacher models and arrives at the corresponding candidate student model; and a training sub-unit configured to train the corresponding candidate student model on each of the training paths or train the corresponding at least one intermediate teacher model and the corresponding candidate student model on the training path in the order of the models arranged on the training path.

In an embodiment, the training sub-unit is further configured to train the corresponding candidate student model by using the source data as the input and the pseudo target data output by the original teacher model that has been trained as the verification data for the corresponding candidate student model when the training path starts from the original teacher model and directly arrives at the corresponding candidate student model, or to train the respective intermediate teacher models by using the source data as the input and the pseudo target data output by a preceding adjacent complex teacher model on the training path as the verification data and train the corresponding candidate student model by using the pseudo target data output by a preceding intermediate teacher model adjacent to the candidate student model on the training path as the verification data when the training path starts from the original teacher model, passes the at least one intermediate teacher model and arrives at the corresponding candidate student model. The complex teacher model is the original teacher model that has been trained, or another intermediate teacher model that has been trained and has the number of model parameters that is greater than that of the intermediate teacher model currently under training.

In an embodiment, the target model selection unit 150 is further configured to test accuracy of output results of the multiple candidate student models through a set of verification data, and select the target student model according to the accuracy.

In an embodiment, the number of model parameters of any of the intermediate teacher models being less than that of the original teacher model includes the number of model layers of any of the intermediate teacher models being less than that of the original teacher model.

In an embodiment, the training sample obtaining unit 110 is further configured to obtain a first language corpus as the source data, and obtain a second language corpus having the same meaning as the first language corpus as the target data.

In an embodiment, the original model training unit 120 is further configured to segment the first language corpus and the second language corpus to obtain multiple first language words and multiple second language words, respectively; vectorize the multiple first language words and the multiple second language words to correspond to multiple first language word vectors and multiple second language word vectors, respectively; obtain a first language corpus vector based on the first language word vectors through an encoder and an attention mechanism; obtain a second language corpus vector based on the second language word vectors through a decoder and the attention mechanism; and train the original teacher model according to the first language corpus vector and the second language corpus vector.

The operation of each of the units of the neural network model compression device 100 has been described in detail in the embodiments of the relative method, and will not be repeated here.

Figure 7:
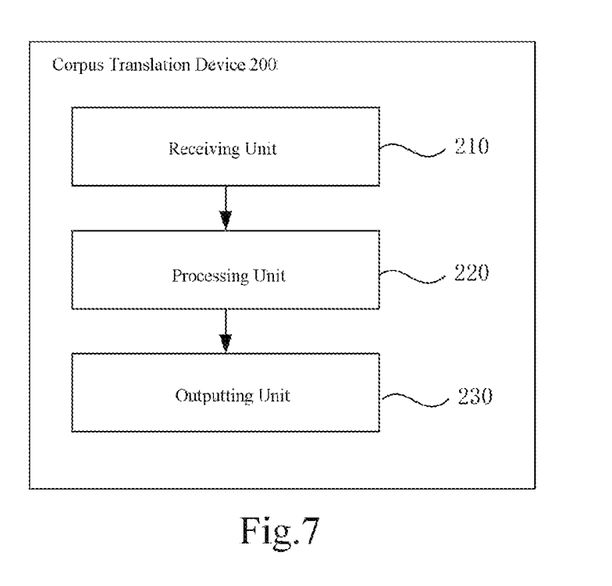
FIG. 7 is a block diagram of a corpus translation device according to an exemplary embodiment.

FIG. 7 is a block diagram of a corpus translation device 200, according to an exemplary embodiment. As shown in FIG. 7, the corpus translation device 200 includes a receiving unit 210 configured to obtain a corpus; a processing unit 220 configured to translate the corpus with a neural network model, wherein the neural network model is a target student model obtained by the neural network model compression method 10 of any of the foregoing embodiments; and an outputting unit 230 configured to output a translation result.

The operation of each of the units of the corpus translation device 200 has been described in detail in the embodiments of the relative method, and will not be repeated here.

Figure 8:
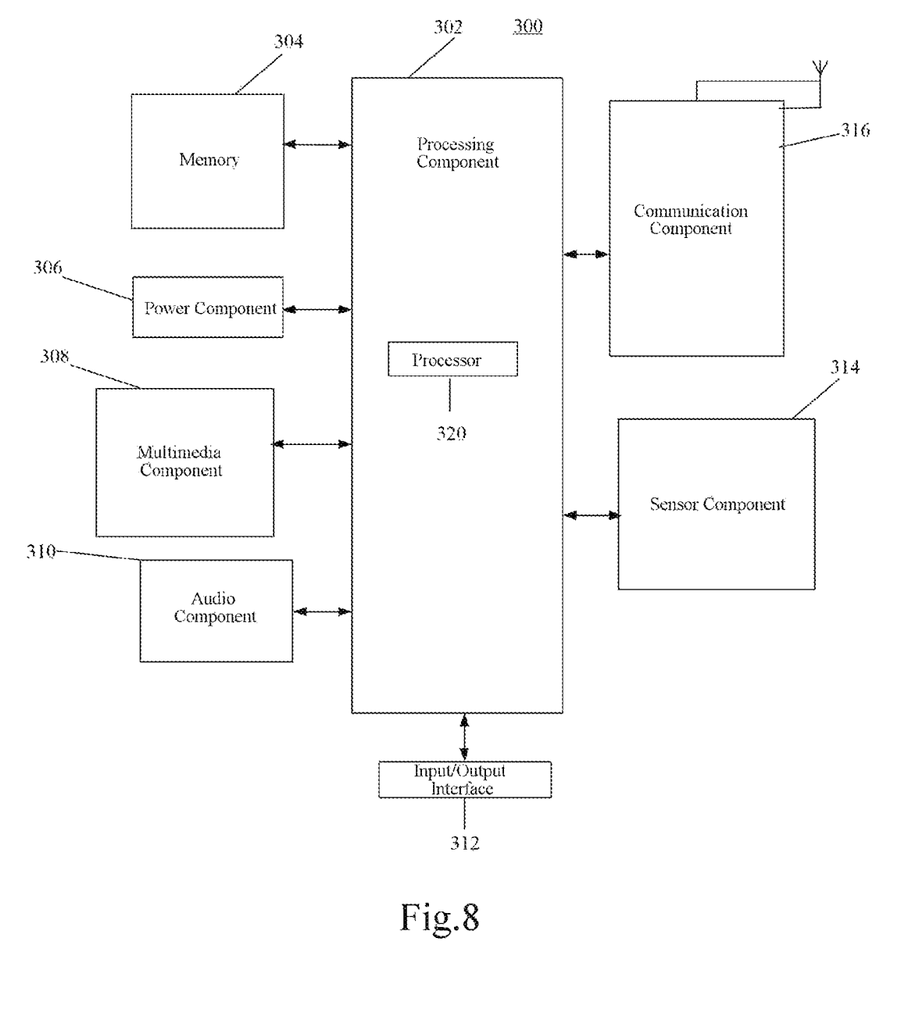
FIG. 8 is a block diagram of a device according to an exemplary embodiment.

FIG. 8 is a block diagram of a device 300 according to an exemplary embodiment. The device 300 may be any of the devices in the foregoing embodiments. For example, the device 300 may be a mobile phone, a computer, a digital broadcasting terminal, a messaging device, a game console, a tablet device, a medical device, an exercise equipment, a personal digital assistant, or the like.

Referring to FIG. 8, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera. and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 4G, or 5G, or a combination thereof in one exemplary embodiment, the communication component 316 receives a broadcast signal or broadcast associated information from an external broadcast management system via a broadcast channel in one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (MB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

Figure 9:
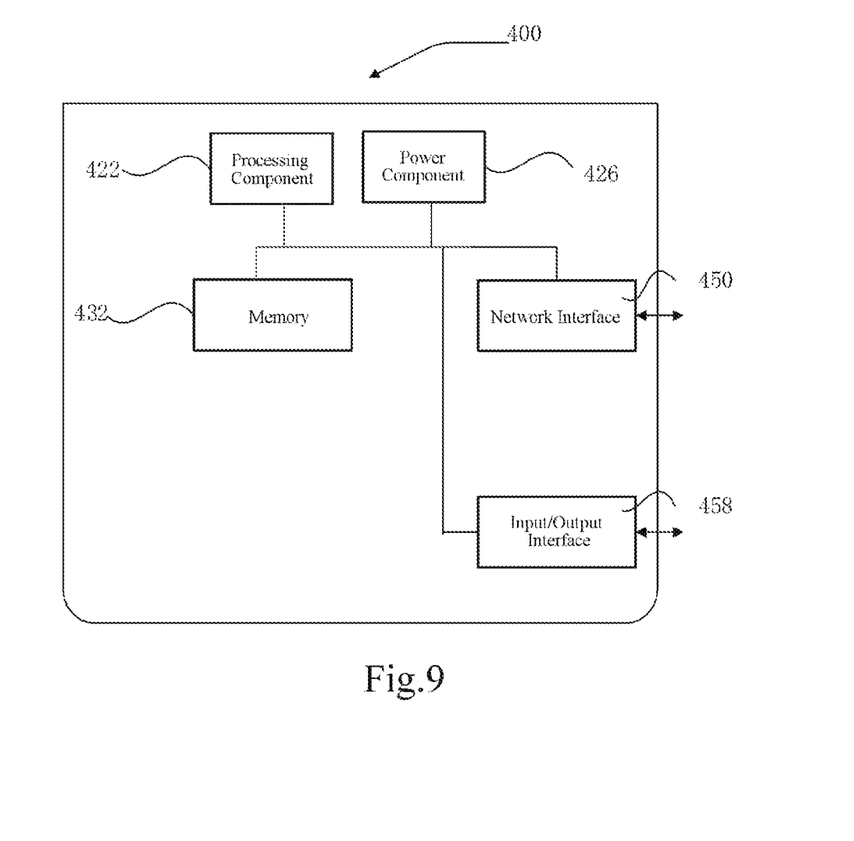
FIG. 9 is a block diagram of an electronic device according to an exemplary embodiment.

FIG. 9 is a block diagram of an electronic device 400 according to an exemplary embodiment. For example, the device 400 may be provided as a server. Referring to FIG. 9, the device 400 includes a processing component 422 that further includes one or more processors, and memory resources represented by a memory 432 for storing instructions executable by the processing component 422, such as application programs. The application programs stored in the memory 432 may include one or more modules each corresponding to a set of instructions. Further, the processing component 422 is configured to execute the instructions to perform the above described methods.

The device 400 may also include a power component 426 configured to perform power management of the device 400, wired or wireless network interface(s) 450 configured to connect the device 400 to a network, and an input/output (I/O) interface 458. The device 400 may operate based on an operating system stored in the memory 432, such as Windows Server™, Mac OS X™, Unix™, Linux™, FreeBSD™, or the like.

Other embodiments of the invention will be apparent to those skilled in the art from consideration of the specification and practice of the present disclosure. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for compressing a neural network model, comprising:
obtaining a set of training samples including a plurality of pairs of training samples, each pair of the training samples including source data and target data corresponding to the source data;
training an original teacher model by using the source data as an input and using the target data as verification data;
training one or more intermediate teacher models based on the set of training samples and the original teacher model, the one or more intermediate teacher models forming a set of teacher models;
training multiple candidate student models based on the set of training samples, the original teacher model, and the set of teacher models, the multiple candidate student models forming a set of student models;
testing accuracy of output results of the multiple candidate student models through a set of verification data; and
selecting a candidate student model of the multiple candidate student models as a target student model according to the accuracy,
wherein a number of model parameters of any of the intermediate teacher models is less than that of the original teacher model.

2. The method of claim 1, wherein the training one or more intermediate teacher models based on the set of training samples and the original teacher model comprises:
training each of the intermediate teacher models to be trained by using the source data as the input and using pseudo target data output by a complex teacher model as the verification data, the complex teacher model being one of the original teacher model that has been trained, or another intermediate teacher model that has been trained and of which a number of model parameters is greater than that of an intermediate teacher model currently under training.

3. The method of claim 2, wherein the one or more intermediate teacher models in the set of teacher models are ranked in a descending order of numbers of model parameters thereof so that the number of model parameters of the intermediate teacher model in a subsequent rank is less than that of the intermediate teacher model in a preceding rank, and the complex teacher model used to train an intermediate teacher model of a current rank is one of the original teacher model that has been trained or the intermediate teacher model in any preceding rank that has been trained.

4. The method of claim 1, wherein the training multiple candidate student models based on the set of training samples, the original teacher model, and the set of teacher models comprises one of:
determining multiple training paths, each of the multiple training paths corresponds to one of the multiple candidate student models and starts from the original teacher model and directly arrives at a corresponding candidate student model, and training the corresponding candidate student model on each of the training paths, in an order of models arranged on the training path; or
determining multiple training paths, each of the multiple training paths corresponds to one of the multiple candidate student models and starts from the original teacher model, passes at least one of the intermediate teacher models and arrives at a corresponding candidate student model, and training the at least one of the intermediate teacher models and the corresponding candidate student model on each of the training paths, in an order of models arranged on the training path.

5. The method of claim 4, further comprising:
when the training path starts from the original teacher model and directly arrives at the corresponding candidate student model, training the corresponding candidate student model by using the source data as the input and pseudo target data output by the original teacher model that has been trained as the verification data for the corresponding candidate student model; and
when the training path starts from the original teacher model, passes at least one of the intermediate teacher models and arrives at a corresponding candidate student model, training the respective intermediate teacher models by using the source data as the input and pseudo target data output by a preceding adjacent complex teacher model on the training path as the verification data, and training the corresponding candidate student model by using pseudo target data output by a preceding intermediate teacher model adjacent to the candidate student model on the training path as the verification data for the candidate student model, wherein the complex teacher model is one of the original teacher model that has been trained, or another intermediate teacher model that has been trained and has a number of model parameters that is greater than that of an intermediate teacher model currently under training.

6. The method of claim 1, wherein the number of model parameters of any of the intermediate teacher models being less than that of the original teacher model comprises a number of model layers of any of the intermediate teacher models being less than that of the original teacher model.

7. The method of claim 1, wherein the obtaining the set of training samples including the plurality of pairs of training samples comprises:
obtaining a first language corpus as the source data, and obtaining a second language corpus having a same meaning as the first language corpus as the target data.

8. The method of claim 7, wherein the training the original teacher model by using the source data as the input and using the target data as verification data comprises:
segmenting the first language corpus and the second language corpus to obtain multiple first language words and multiple second language words, respectively;
vectorizing the multiple first language words and the multiple second language words to correspond to multiple first language word vectors and multiple second language word vectors, respectively;
obtaining a first language corpus vector based on the first language word vectors through an encoder and an attention mechanism;
obtaining a second language corpus vector based on the second language word vectors through a decoder and the attention mechanism; and training the original teacher model according to the first language corpus vector and the second language corpus vector.

9. A corpus translation method, comprising:
obtaining a corpus;
translating the corpus with a neural network model, and outputting a translation result,
wherein the neural network model is a target student model obtained by the method for compressing the neural network model of claim 1.

10. A device for compressing a neural network model, comprising:
a processor; and
a memory storing instructions executable by the processor;
wherein the processor is configured to:
obtain a set of training samples including a plurality of pairs of training samples, each pair of the training samples including source data and target data corresponding to the source data;
train an original teacher model by using the source data as an input and the target data as verification data;
train one or more intermediate teacher models based on the set of training samples and the original teacher model, the one or more intermediate teacher models forming a set of teacher models;
train multiple candidate student models based on the set of training samples, the original teacher model and the set of teacher models, the multiple candidate student models forming a set of student models;
test accuracy of output results of the multiple candidate student models through a set of verification data; and
select a candidate student model of the multiple candidate student models as a target student model according to the accuracy,
wherein a number of model parameters of any of the intermediate teacher models is less than that of the original teacher model.

11. The device of claim 10, wherein the processor is further configured to:
train each of the intermediate teacher models to be trained by using the source data as the input and using pseudo target data output by a complex teacher model as the verification data, wherein the complex teacher model is one of the original teacher model that has been trained, or another intermediate teacher model that has been trained and of which a number of model parameters is greater than that of an intermediate teacher model currently under training.

12. The device of claim 11, wherein the one or more intermediate teacher models in the set of teacher models are ranked in a descending order of numbers of model parameters thereof so that the number of model parameters of the intermediate teacher model in a subsequent rank is less than that of the intermediate teacher model in a preceding rank, and the complex teacher model used to train an intermediate teacher model of a current rank is one of the original teacher model that has been trained or the intermediate teacher model in any preceding rank that has been trained.

13. The device of claim 10, wherein the processor is further configured to perform one of:
determining multiple training paths, each of the multiple training paths corresponds to one of the candidate student models and starts from the original teacher model and directly arrives at the corresponding candidate student model; and training the corresponding candidate student model on each of the training paths in an order of models arranged on the training path; or
determining multiple training paths, each of the multiple training paths corresponds to one of the multiple candidate student models and starts from the original teacher model, passes at least one of the intermediate teacher models and arrives at a corresponding candidate student model, and training the at least one of the intermediate teacher models and the corresponding candidate student model on each of the training paths, in an order of models arranged on the training path.

14. The device of claim 13, wherein the processor is further configured to
when the training path starts from the original teacher model and directly arrives at the corresponding candidate student model, train the corresponding candidate student model by using the source data as the input and pseudo target data output by the original teacher model that has been trained as the verification data for the corresponding candidate student model; and
when the training path starts from the original teacher model, passes at least one of the intermediate teacher models and arrives at a corresponding candidate student model, train the respective intermediate teacher models by using the source data as the input and the pseudo target data output by a preceding adjacent complex teacher model on the training path as the verification data, and train the corresponding candidate student model by using pseudo target data output by a preceding intermediate teacher model adjacent to the candidate student model on the training path as the verification data for the candidate student model, wherein the complex teacher model is one of the original teacher model that has been trained, or another intermediate teacher model that has been trained and has a number of model parameters that is greater than that of an intermediate teacher model currently under training.

15. The device of claim 10, wherein the number of model parameters of any of the intermediate teacher models being less than that of the original teacher model comprises a number of model layers of any of the intermediate teacher models being less than that of the original teacher model.

16. The device of claim 10, wherein the processor is further configured to:
obtain a first language corpus as the source data, and obtain a second language corpus having a same meaning as the first language corpus as the target data;
segment the first language corpus and the second language corpus to obtain multiple first language words and multiple second language words, respectively;
vectorize the multiple first language words and the multiple second language words to correspond to multiple first language word vectors and multiple second language word vectors, respectively;
obtain a first language corpus vector based on the first language word vectors through an encoder and an attention mechanism;
obtain a second language corpus vector based on the second language word vectors through a decoder and the attention mechanism; and
train the original teacher model according to the first language corpus vector and the second language corpus vector.

17. A non-transitory computer-readable storage medium having stored therein instructions that, when executed by a processor of a device, cause the device to perform a method for compressing a neural network model, the method comprising:
- obtaining a set of training samples including a plurality of pairs of training samples, each pair of the training samples including source data and target data corresponding to the source data;
- training an original teacher model by using the source data as an input and using the target data as verification data;
- training one or more intermediate teacher models based on the set of training samples and the original teacher model, the one or more intermediate teacher models forming a set of teacher models;
- training multiple candidate student models based on the set of training samples, the original teacher model, and the set of teacher models, the multiple candidate student models forming a set of student models;
- testing accuracy of output results of the multiple candidate student models through a set of verification data; and
- selecting a candidate student model of the multiple candidate student models as a target student model according to the accuracy,
- wherein a number of model parameters of any of the intermediate teacher models is less than that of the original teacher model.

* * * * *